US012592564B2

(12) United States Patent
Zhao et al.

(10) Patent No.: US 12,592,564 B2
(45) Date of Patent: Mar. 31, 2026

(54) DC-COUPLED PHOTOVOLTAIC POWER GENERATION SYSTEM, OPERATING STATE SWITCHING METHOD AND DEVICE OF DC-COUPLED PHOTOVOLTAIC POWER GENERATION SYSTEM

(71) Applicant: Sungrow Power Supply Co., Ltd., Hefei (CN)

(72) Inventors: Shizun Zhao, Hefei (CN); Zhengyang Wang, Hefei (CN); Jitao Lu, Hefei (CN); Tongfei Xia, Hefei (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 0 days.

(21) Appl. No.: 18/751,815

(22) Filed: Jun. 24, 2024

(65) Prior Publication Data

US 2025/0015590 A1     Jan. 9, 2025

(30) Foreign Application Priority Data

Jul. 5, 2023     (CN) .......................... 202310821897.3

(51) Int. Cl.
| | |
|---|---|
| *H02J 3/00* | (2006.01) |
| *H02J 3/007* | (2026.01) |
| *H02J 3/38* | (2006.01) |

(52) U.S. Cl.
CPC .............. *H02J 3/0075* (2020.01); *H02J 3/38* (2013.01); *H02J 2300/26* (2020.01)

(58) Field of Classification Search
CPC ........ H02J 3/0075; H02J 3/38; H02J 2300/24; H02J 2300/26
USPC ......................................................... 307/23
See application file for complete search history.

(56) References Cited

U.S. PATENT DOCUMENTS

| | | |
|---|---|---|
| 2014/0319914 A1 | 10/2014 | Nomura |
| 2020/0153351 A1* | 5/2020 | Jiao ........................ H02J 7/0018 |
| 2024/0014682 A1 | 1/2024 | Lu et al. |

FOREIGN PATENT DOCUMENTS

| | | |
|---|---|---|
| WO | WO 2019/147372 A2 | 8/2019 |
| WO | WO 2022/199585 A1 | 9/2022 |

OTHER PUBLICATIONS

First Examination Report for Australian Patent Application No. 2024203674, dated Feb. 28, 2025.

* cited by examiner

*Primary Examiner* — Hal Kaplan
(74) *Attorney, Agent, or Firm* — Wolf, Greenfield & Sacks, P.C.

(57)     ABSTRACT

A DC-coupled photovoltaic power generation system, an operating state switching method and device of the DC-coupled photovoltaic power generation system are provided according to the present disclosure. The method includes: obtaining photovoltaic energy of the DC-coupled photovoltaic power generation system and determining whether the photovoltaic energy is sufficient, in a case that the DC-coupled photovoltaic power generation system operates in a grid-connected battery priority state; and if it is determined that the photovoltaic energy is insufficient, performing an online switchover operation, where the online switchover operation is used to switch the operating state of the DC-coupled photovoltaic power generation system from the grid-connected battery priority state to a nighttime battery discharge state.

13 Claims, 6 Drawing Sheets

| First obtaining and determination unit 101 | Online switching unit 102 |

DC-COUPLED PHOTOVOLTAIC POWER GENERATION SYSTEM, OPERATING STATE SWITCHING METHOD AND DEVICE OF DC-COUPLED PHOTOVOLTAIC POWER GENERATION SYSTEM

The present application claims priority to Chinese Patent Application No. 202310821897.3, titled "DC-COUPLED PHOTOVOLTAIC POWER GENERATION SYSTEM, OPERATING STATE SWITCHING METHOD AND DEVICE OF DC-COUPLED PHOTOVOLTAIC POWER GENERATION SYSTEM", filed on Jul. 5, 2023 with the China National Intellectual Property Administration, which is incorporated herein by reference in its entirety.

FIELD

The present disclosure relates to the technical field of data processing, and in particular to a direct current (DC)-coupled photovoltaic power generation system, an operating state switching method and an operating state switching device of the DC-coupled photovoltaic power generation system.

BACKGROUND

A DC-coupled photovoltaic power generation system mainly operates in a grid-connected photovoltaic priority state, a grid-connected battery priority state, a battery charge priority state, a nighttime battery discharge state, and a nighttime battery charge state and the like. Since a single operating state fails to meet the requirement of operating round the clock, the system is to be switched from an operating state to another operating state.

For various application scenarios, there is a scenario that the DC-coupled photovoltaic power generation system is switched from the grid-connected photovoltaic priority state to the nighttime battery charge state and the nighttime battery discharge state. At present, in order to ensure stability of the system, the operating states of the DC-coupled photovoltaic power generation system are usually switched offline, resulting in a slow response speed of the system.

SUMMARY

In view of the above, a DC-coupled photovoltaic power generation system, an operating state switching method and an operating state switching device of the DC-coupled photovoltaic power generation system are provided according to embodiments of the present disclosure, to solve the problem of the slow response speed of the system caused by offline switching the operating state of the DC-coupled photovoltaic power generation system according to the conventional technology.

In order to achieve the above objectives, the following technical solutions are provided according to the embodiments of the present disclosure.

In a first aspect, an operating state switching method of a DC-coupled photovoltaic power generation system is provided according to an embodiment of the present disclosure. The method includes: obtaining photovoltaic energy of the DC-coupled photovoltaic power generation system and determining whether the photovoltaic energy is sufficient, in a case that the DC-coupled photovoltaic power generation system operates in a grid-connected battery priority state; and if it is determined that the photovoltaic energy is insufficient, performing an online switchover operation, where the online switchover operation is used to switch the operating state of the DC-coupled photovoltaic power generation system from the grid-connected battery priority state to a nighttime battery discharge state.

In an embodiment, in the above operating state switching method of the DC-coupled photovoltaic power generation system, in a case of determining that the photovoltaic energy is sufficient, the method further includes: controlling the DC-coupled photovoltaic power generation system to remain in the grid-connected battery priority state.

In an embodiment, before the performing an online switchover operation, the above operating state switching method of the DC-coupled photovoltaic power generation system further includes: determining whether a duration for which the photovoltaic energy of the DC-coupled photovoltaic power generation system is insufficient is greater than a preset duration. If it is determined that the duration for which the photovoltaic energy of the DC-coupled photovoltaic power generation system is insufficient is greater than the preset duration, the online switchover operation is performed. If it is determined that the duration for which the photovoltaic energy of the DC-coupled photovoltaic power generation system is insufficient is less than or equal to the preset duration, it is determined whether the duration for which the photovoltaic energy of the DC-coupled photovoltaic power generation system is insufficient is greater than the preset duration, until it is determined that the duration for which the photovoltaic energy of the DC-coupled photovoltaic power generation system is insufficient is greater than the preset duration.

In an embodiment, in the above operating state switching method of the DC-coupled photovoltaic power generation system, the determining whether the photovoltaic energy is sufficient includes: determining whether a voltage at a photovoltaic side of the DC-coupled photovoltaic power generation system is greater than a preset voltage; if it is determined that the voltage at the photovoltaic side of the DC-coupled photovoltaic power generation system is greater than the preset voltage, determining that the photovoltaic energy is sufficient; and if it is determined that the voltage at the photovoltaic side of the DC-coupled photovoltaic power generation system is less than or equal to the preset voltage, determining that the photovoltaic energy is insufficient.

In an embodiment, in the above operating state switching method of the DC-coupled photovoltaic power generation system, the determining whether the photovoltaic energy is sufficient includes: determining whether an output power of a photovoltaic side of the DC-coupled photovoltaic power generation system is greater than a preset power; if it is determined that the output power of the photovoltaic side of the DC-coupled photovoltaic power generation system is greater than the preset power, determining that the photovoltaic energy is sufficient; and if it is determined that the output power of the photovoltaic side of the DC-coupled photovoltaic power generation system is less than or equal to the preset power, determining that the photovoltaic energy is insufficient.

In an embodiment, in the above operating state switching method of the DC-coupled photovoltaic power generation system, the online switchover operation includes: decreasing an operating power of the direct current converter in the DC-coupled photovoltaic power generation system to a first preset conversion power, and decreasing an operating power of a photovoltaic inverter in the DC-coupled photovoltaic power generation system to a first preset inversion power; controlling the direct current converter to operate at a constant bus voltage, controlling the photovoltaic inverter to operate at a second preset inversion power, and controlling a bus voltage of the photovoltaic inverter by a constant voltage tracking (CVT) way, when the operating power of the photovoltaic inverter in the DC-coupled photovoltaic power generation system is decreased to the first preset inversion power; and turning off a switch at a direct current side of the photovoltaic inverter.

In an embodiment, the operating state switching method of the DC-coupled photovoltaic power generation system further includes: obtaining, when the DC-coupled photovoltaic power generation system is started, the photovoltaic energy of the DC-coupled photovoltaic power generation system and determining whether the photovoltaic energy is sufficient; and if it is determined that the photovoltaic energy is sufficient, controlling the DC-coupled photovoltaic power generation system to enter the grid-connected battery priority state.

In an embodiment, in the above operating state switching method of the DC-coupled photovoltaic power generation system, the controlling the DC-coupled photovoltaic power generation system to enter the grid-connected battery priority state includes: setting a photovoltaic inverter in the DC-coupled photovoltaic power generation system to operate at full power, and setting a bus voltage to be in a maximum power point tracking (MPPT) mode; turning on the photovoltaic inverter when the bus voltage is in the MPPT mode; setting a direct current converter in the DC-coupled photovoltaic power generation system to be in a constant power mode, and controlling the direct current converter to discharge at a second preset conversion power.

In a second aspect, an operating state switching device of a DC-coupled photovoltaic power generation system is provided according to an embodiment of the present disclosure. The device includes a first obtaining and determination unit and an online switching unit.

The first obtaining and determination unit is configured to obtain photovoltaic energy of the DC-coupled photovoltaic power generation system and determine whether the photovoltaic energy is sufficient, in a case that the DC-coupled photovoltaic power generation system operates in a grid-connected battery priority state.

The online switching unit is configured to perform an online switchover operation if it is determined that the photovoltaic energy is insufficient. The online switchover operation is used to switch the operating state of the DC-coupled photovoltaic power generation system from the grid-connected battery priority state to a nighttime battery discharge state.

In an embodiment, the operating state switching device of the DC-coupled photovoltaic power generation system further includes a first control unit. The first control unit is configured to control the DC-coupled photovoltaic power generation system to remain in the grid-connected battery priority state, if it is determined that the photovoltaic energy is sufficient.

In an embodiment, the operating state switching device of the DC-coupled photovoltaic power generation system further includes a determination unit. The determination unit is configured to, before performing the online switchover operation, whether a duration for which the photovoltaic energy of the DC-coupled photovoltaic power generation system is insufficient is greater than a preset duration. If it is determined that the duration for which the photovoltaic energy of the DC-coupled photovoltaic power generation system is insufficient is greater than the preset duration, the online switchover operation is performed. If it is determined that the duration for which the photovoltaic energy of the DC-coupled photovoltaic power generation system is insufficient is less than or equal to the preset duration, it is determined whether the duration for which the photovoltaic energy of the DC-coupled photovoltaic power generation system is insufficient is greater than the preset duration, until it is determined that the duration for which the photovoltaic energy of the DC-coupled photovoltaic power generation system is insufficient is greater than the preset duration.

In an embodiment, the operating state switching device of the DC-coupled photovoltaic power generation system further includes a second obtaining and determination unit and a second control unit.

The second obtaining and determination unit is configured to obtain, when the DC-coupled photovoltaic power generation system is started, the photovoltaic energy of the DC-coupled photovoltaic power generation system and determine whether the photovoltaic energy is sufficient.

The second control unit is configured to control the DC-coupled photovoltaic power generation system to enter the grid-connected battery priority state, if it is determined that the photovoltaic energy is sufficient.

In a third aspect, a DC-coupled photovoltaic power generation system is provided according to an embodiment of the present disclosure, and includes an energy storage battery, a direct current converter, a photovoltaic array, a photovoltaic inverter, a battery system controller and a local controller. A direct current side of the photovoltaic inverter is connected to an output side of the direct current converter and an output side of the photovoltaic array, an output side of the energy storage battery is connected to an input side of the direct current converter, and an alternating-current side of the photovoltaic inverter is connected to a power grid. The photovoltaic inverter is communicatively connected to the direct current converter, the battery system controller is communicatively connected to the direct current converter and the energy storage battery, and the local controller is communicatively connected to the battery system controller and the photovoltaic inverter, to implement the operating state switching method of the DC-coupled photovoltaic power generation system according to the first aspect.

The operating state switching method of the DC-coupled photovoltaic power generation system is provided according to the embodiments of the present disclosure. The method includes: obtaining the photovoltaic energy of the DC-coupled photovoltaic power generation system and determining whether the photovoltaic energy is sufficient, in a case that the DC-coupled photovoltaic power generation system operates in the grid-connected battery priority state; if it is determined that the photovoltaic energy is insufficient, performing the online switchover operation, where the online switchover operation is used to switch the operating state of the DC-coupled photovoltaic power generation system from the grid-connected battery priority state to the nighttime battery discharge state. With the method, operating modes of the photovoltaic inverter and the direct current converter can be switched online based on the photovoltaic energy without shutting down the system, improving the response speed of the system, and solving the problem of the slow response speed of the system caused by offline switching the operating state of the DC-coupled photovoltaic power generation system according to the conventional technology.

BRIEF DESCRIPTION OF THE DRAWINGS

In order to more clearly illustrate technical solutions in embodiments of the present disclosure or in the conventional technology, drawings to be used in the description of the embodiments or the conventional technology are briefly described hereinafter. It is apparent that the drawings described below show only the embodiments of the present disclosure, and other drawings may be obtained by those skilled in the art from the drawings without any creative work.

DETAILED DESCRIPTION

Technical solutions of embodiments of the present disclosure are clearly and completely described hereinafter in conjunction with the drawings of the embodiments of the present disclosure. Apparently, the embodiments described in the following are only some embodiments of the present disclosure, rather than all the embodiments. Based on the embodiments of the present disclosure, all of the other embodiments obtained by those skilled in the art without any creative work fall within the protection scope of the present disclosure.

In the present disclosure, terms "include", "comprise" or any other variants thereof are intended to be non-exclusive. Therefore, a process, method, article or device including a series of elements includes not only the elements but also other elements that are not explicitly listed, or further include elements inherent to the process, method, article or device. Unless expressively limited otherwise, a process, method, article or device limited by "comprising/including a(n) . . . " does not exclude existence of another identical element in such process, method, article or device including the enumerated elements.

An operating state switching method of a DC-coupled photovoltaic power generation system is provided according to an embodiment of the present disclosure, to solve the problem of the slow response speed of the system caused by offline switching the operating state of the DC-coupled photovoltaic power generation system according to the conventional technology.

Figure 1:
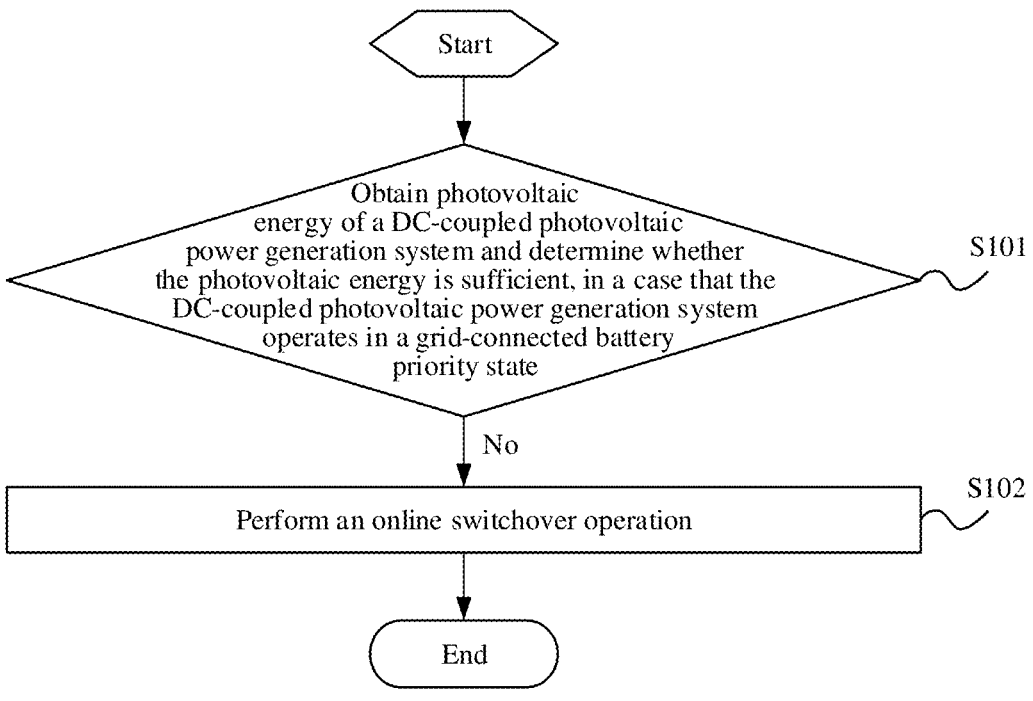
FIG. 1 is a flowchart of an operating state switching method of a DC-coupled photovoltaic power generation system according to an embodiment of the present disclosure.

Referring to FIG. 1, the operating state switching method of the DC-coupled photovoltaic power generation system mainly includes the following steps S101 and S102.

In step S101, in a case that the DC-coupled photovoltaic power generation system operates in a grid-connected battery priority state, photovoltaic energy of the DC-coupled photovoltaic power generation system is obtained, and it is determined whether the photovoltaic energy is sufficient.

It should be noted that the grid-connected battery priority state includes as follows. A photovoltaic inverter inverts direct current power into alternating current power and feeds the alternating-current power back into a power grid at a constant power, and the required power is preferentially provided by battery discharging through a direct current converter operating at a constant power, and remaining part is provided by a photovoltaic array. The photovoltaic inverter operates at a preset maximum forward power (100%), a bus voltage is controlled by maximum power point tracking (MPPT), the direct current converter operates in a constant power mode, and a forward constant power (that is less than or equal to the preset maximum forward power of the photovoltaic inverter) of the direct current converter is preset. The direct current bus voltage is controlled by the photovoltaic inverter.

Figure 2:
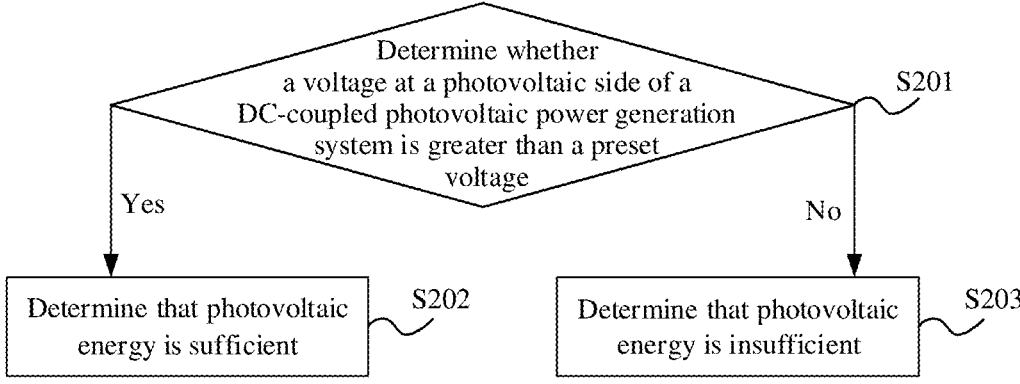
FIG. 2 is a flowchart of determining whether photovoltaic energy is sufficient according to an embodiment of the present disclosure.

In some embodiments, a process of determining whether photovoltaic energy is sufficient is as shown in FIG. 2, and mainly includes the following steps S201 to S203.

In step S201, it is determined whether a voltage at a photovoltaic side of the DC-coupled photovoltaic power generation system is greater than a preset voltage.

The voltage at the photovoltaic side of the DC-coupled photovoltaic power generation system is a voltage outputted by a photovoltaic array in the DC-coupled photovoltaic power generation system.

Specifically, the preset voltage is determined based on a power generation capacity of the photovoltaic array in the DC-coupled photovoltaic power generation system. For example, the preset voltage is set to a value ranging from 950V to 1500V. The preset voltage is not limited herein, and depends on the application environment and user requirements. All the implementations fall within the protection scope of the present disclosure.

If it is determined that the voltage at the photovoltaic side of the DC-coupled photovoltaic power generation system is greater than the preset voltage, the process proceeds to step S202. If it is determined that the voltage at the photovoltaic side of the DC-coupled photovoltaic power generation system is less than or equal to the preset voltage, the process proceeds to step S203.

In step S202, it is determined that the photovoltaic energy is sufficient.

In practice, if it is determined that the voltage at the photovoltaic side of the DC-coupled photovoltaic power generation system is greater than the preset voltage, it is determined that the photovoltaic energy is sufficient.

In step S203, it is determined that the photovoltaic energy is insufficient.

In practice, if it is determined that the voltage at the photovoltaic side of the DC-coupled photovoltaic power generation system is less than or equal to the preset voltage, it is determined that the photovoltaic energy is insufficient.

Figure 3:
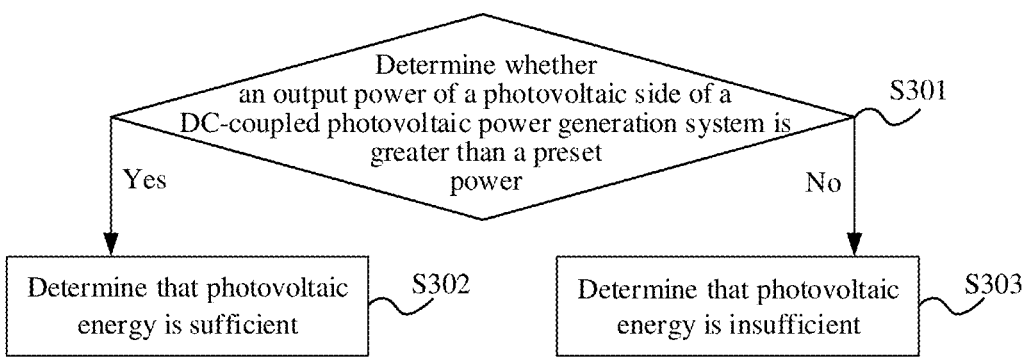
FIG. 3 is a flowchart of determining whether photovoltaic energy is sufficient according to another embodiment of the present disclosure.

In some embodiments, another process of determining whether photovoltaic energy is sufficient is as shown in FIG. 3, and mainly includes the following steps S301 to S303.

In step S301, it is determined whether an output power of the photovoltaic side of the DC-coupled photovoltaic power generation system is greater than a preset power.

The output power of the photovoltaic side of the DC-coupled photovoltaic power generation system is an output power of the photovoltaic array of the DC-coupled photovoltaic power generation system.

Specifically, the preset power is determined based on the output power of the photovoltaic array of the DC-coupled photovoltaic power generation system. Assuming that the output power of the photovoltaic array of the DC-coupled photovoltaic power generation system ranges from 0 to 200 kW, the preset power may be 30 kW. The preset power is not limited herein, and depends on the application environment and user requirements. All the implementations fall within the protection scope of the present disclosure.

If it is determined that the output power of the photovoltaic side of the DC-coupled photovoltaic power generation system is greater than the preset power, the process proceeds to step S302. If it is determined that the output power of the photovoltaic side of the DC-coupled photovoltaic power generation system is less than or equal to the preset power, the process proceeds to step S303.

In step S302, it is determined that the photovoltaic energy is sufficient.

In practice, if it is determined that the output power of the photovoltaic side of the DC-coupled photovoltaic power generation system is greater than the preset power, it is determined that the photovoltaic energy is sufficient.

In step S303, it is determined that the photovoltaic energy is insufficient.

In practice, if it is determined that the output power of the photovoltaic side of the DC-coupled photovoltaic power generation system is less than or equal to the preset power, it is determined that the photovoltaic energy is insufficient.

In practice, if it is determined that the photovoltaic energy is insufficient, the process proceeds to step S102.

In step S102, an online switchover operation is performed.

The online switchover operation is used to switch the operating state of the DC-coupled photovoltaic power generation system from the grid-connected battery priority state to a nighttime battery discharge state.

It should be noted that the nighttime battery discharge state includes as follows. The photovoltaic inverter operates at a constant power, and the required power is provided by the battery discharging through the direct current converter. The photovoltaic inverter determines the operating power of the direct current converter. The direct current converter operates in a constant bus voltage mode and controls the direct current bus voltage.

In practice, the online switchover operation specifically includes as follows. An operating power of the direct current converter in the DC-coupled photovoltaic power generation system is decreased to a first preset conversion power, and an operating power of the photovoltaic inverter in the DC-coupled photovoltaic power generation system is decreased to a first preset inversion power. When the operating power of the photovoltaic inverter in the DC-coupled photovoltaic power generation system is decreased to the first preset inversion power, the direct current converter is controlled to operate in a constant bus voltage mode, the photovoltaic inverter is controlled to operate at a second preset inversion power, and a bus voltage of the photovoltaic inverter is controlled by a constant voltage tracking (CVT) way. Finally, a switch at a direct current side of the photovoltaic inverter is turned off. In such case, the direct current converter operates in the constant bus voltage mode, and when the system operates normally, the online switching process ends, the system enters the nighttime battery discharge state, and the direct current bus voltage is controlled by the direct current converter.

The second preset inversion power is greater than the first preset inversion power. Specifically, the first preset inversion power may be 1% of a rated power of the photovoltaic inverter, and the second preset inversion power may be the operating power of the photovoltaic inverter before being decreased to the first preset inversion power. The first preset inversion power and the second preset inversion power are not limited herein, and depend on the application environment and user requirements. All the implementations fall within the protection scope of the present disclosure.

In practice, the first preset conversion power may be 30 kW. The first preset conversion power is not limited herein, and depends on the application environment and user requirements. All the implementations fall within the protection scope of the present disclosure.

It should be noted that when the operating state is to be switched if it is determined that the photovoltaic energy is insufficient, the operating power of the direct current converter is decreased before switching the operating state, in order to reduce the impact on the power grid during the switching, ensure the safe operating of the system and prevent overvoltage of the system. The operating power of the photovoltaic inverter is decreased to the 1% of the rated power of the photovoltaic inverter. After the operating power of the system is decreased, the direct current converter is controlled to operate at the constant bus voltage, and the bus voltage is controlled by the direct current converter. When the direct current converter is successfully switched from the constant power mode to the constant bus voltage mode, the operating power of the photovoltaic inverter is restored to a power before switching the operating state.

Based on the above principle, the operating state switching method of the DC-coupled photovoltaic power generation system according to the embodiment of the present disclosure includes: obtaining the photovoltaic energy of the DC-coupled photovoltaic power generation system and determining whether the photovoltaic energy is sufficient, in a case that the DC-coupled photovoltaic power generation system operates in the grid-connected battery priority state; and if it is determined that the photovoltaic energy is insufficient, performing the online switchover operation, where the online switchover operation is used to switch the operating state of the DC-coupled photovoltaic power generation system from the grid-connected battery priority state to the nighttime battery discharge state. With the method, operating modes of the photovoltaic inverter and the direct current converter can be switched online based on the photovoltaic energy without shutting down the system, improving the response speed of the system, and solving the problem of the slow response speed of the system caused by offline switching the operating state of the DC-coupled photovoltaic power generation system according to the conventional technology.

In addition, the operating state switching method of the DC-coupled photovoltaic power generation system according to the present disclosure can not only save labor costs, but also maximize the power utilization, preventing the system from being shut down due to a direct current overvoltage fault caused by an unstable bus voltage during the online switching process of the DC-coupled photovoltaic power generation system, thereby avoiding affecting the operation of the system, and improving user experience.

Figure 4:
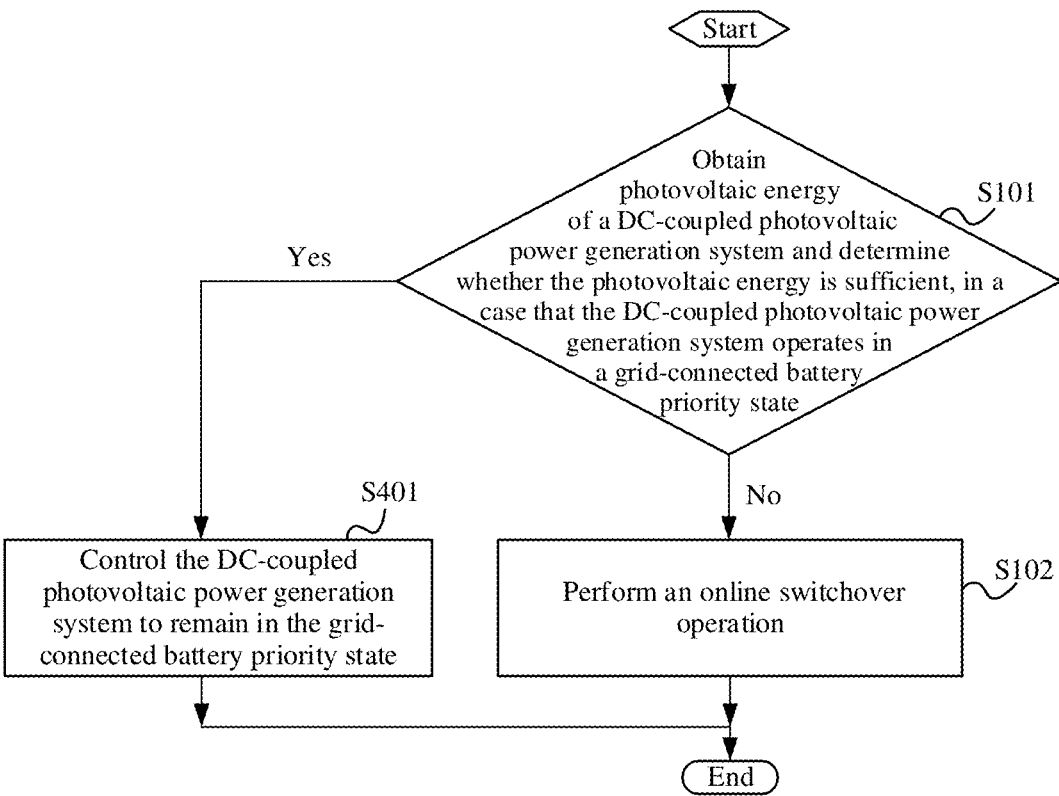
FIG. 4 is a flowchart of an operating state switching method of a DC-coupled photovoltaic power generation system according to another embodiment of the present disclosure.

In an embodiment, referring to FIG. 4, an operating state switching method of the DC-coupled photovoltaic power generation system is provided according to another embodiment of the present disclosure. If it is determined that the photovoltaic energy is sufficient, the method further includes the following step S401.

In step S401, the DC-coupled photovoltaic power generation system is controlled to remain in the grid-connected battery priority state.

In practice, in a case that the DC-coupled photovoltaic power generation system operates in the grid-connected battery priority state, the photovoltaic energy of the DC-coupled photovoltaic power generation system is obtained, and it is determined whether the photovoltaic energy is sufficient. If it is determined that the photovoltaic energy is sufficient, it indicates that the power generation capacity of the photovoltaic array in the DC-coupled photovoltaic power generation system can ensure that the DC-coupled photovoltaic power generation system operates in the grid-connected battery priority state.

Figure 5:
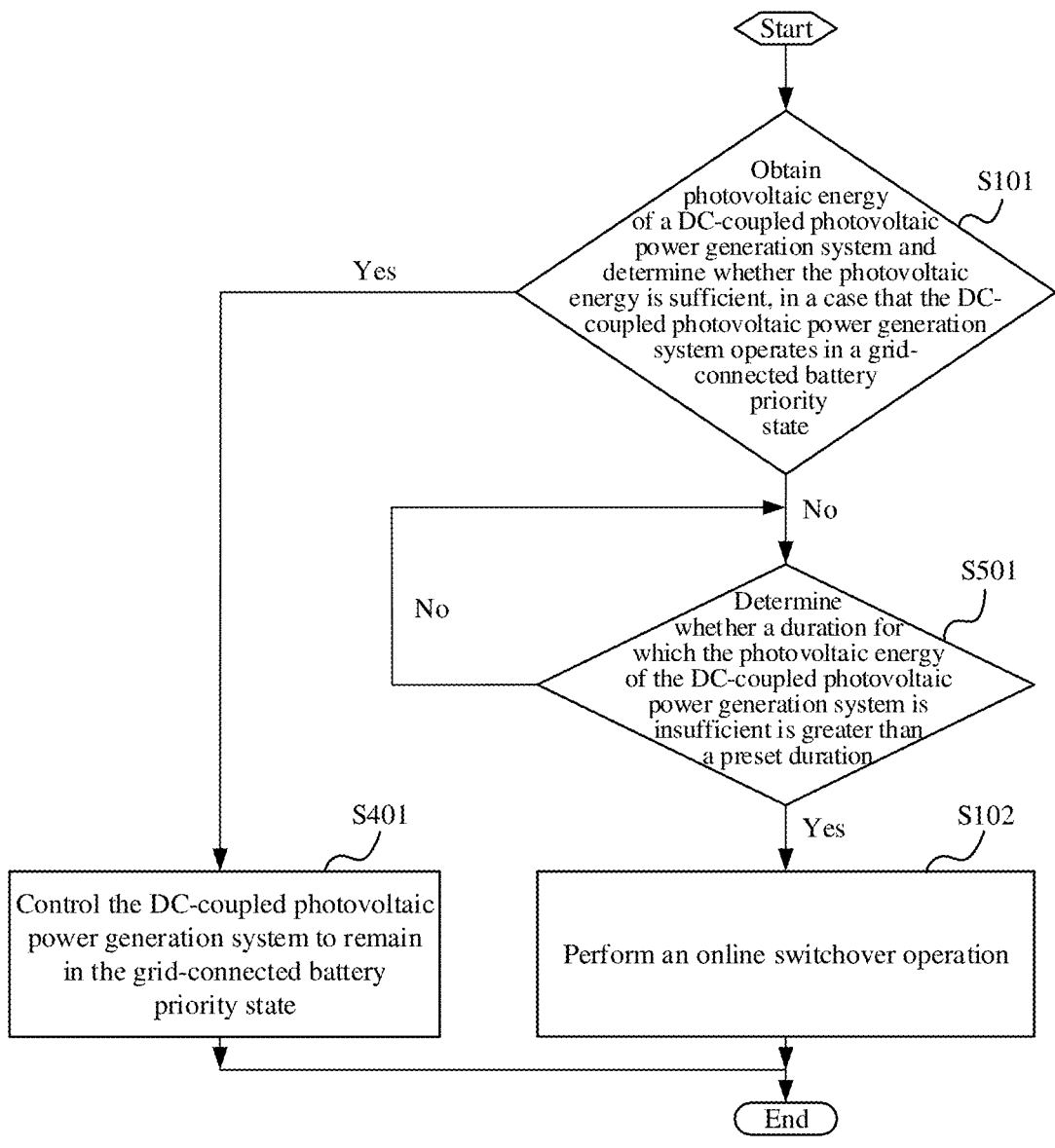
FIG. 5 is a flowchart of an operating state switching method of a DC-coupled photovoltaic power generation system according to another embodiment of the present disclosure.

In an embodiment, referring to FIG. 5, an operating state switching method of the DC-coupled photovoltaic power generation system is provided according to another embodiment of the present disclosure. Before step S102 of performing the online switchover operation, the method may further include the following step S501.

In step S501, it is determined whether a duration for which the photovoltaic energy of the DC-coupled photovoltaic power generation system is insufficient is greater than a preset duration.

If it is determined that the duration for which the photovoltaic energy of the DC-coupled photovoltaic power generation system is insufficient is greater than the preset duration, the online switchover operation is performed, i.e., the process proceeds to step S102. If it is determined that the duration for which the photovoltaic energy of the DC-coupled photovoltaic power generation system is insufficient is less than or equal to the preset duration, it is determined whether the duration for which the photovoltaic energy of the DC-coupled photovoltaic power generation system is insufficient is greater than the preset duration, i.e., the process proceeds to step S501, until it is determined that the duration for which the photovoltaic energy of the DC-coupled photovoltaic power generation system is insufficient is greater than the preset duration.

In this embodiment, before performing the online switchover operation, it is predetermined whether the duration for which the photovoltaic energy of the DC-coupled photovoltaic power generation system is insufficient is greater than the preset duration, further improving reliability of the operating state switching method of the DC-coupled photovoltaic power generation system.

Figure 6:
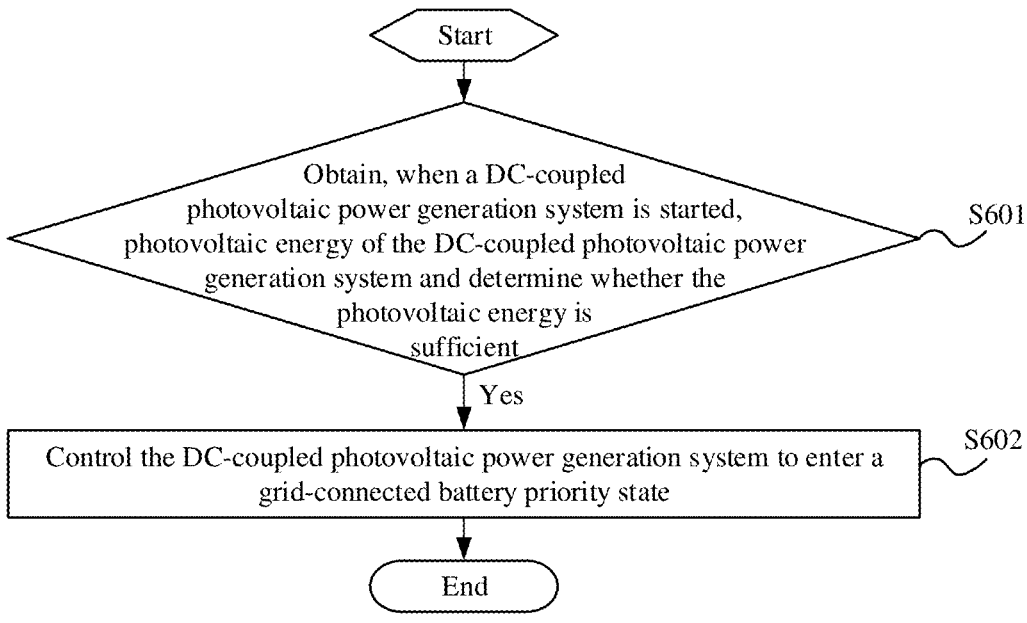
FIG. 6 is a flowchart of an operating state switching method of a DC-coupled photovoltaic power generation system according to another embodiment of the present disclosure.

In an embodiment, referring to FIG. 6, an operating state switching method of the DC-coupled photovoltaic power generation system is provided according to another embodiment of the present disclosure. The method further includes the following steps S601 to S602.

In step S601, the photovoltaic energy of the DC-coupled photovoltaic power generation system is obtained when the DC-coupled photovoltaic power generation system is started, and it is determined whether the photovoltaic energy is sufficient.

It should be noted that, for details of obtaining the photovoltaic energy of the DC-coupled photovoltaic power generation system and determining whether the photovoltaic energy is sufficient in step S601, reference is made to the above embodiments, which is not repeated herein.

If it is determined that the photovoltaic energy is sufficient, the process proceeds to step S602.

In step S602, the DC-coupled photovoltaic power generation system is controlled to enter the grid-connected battery priority state.

In practice, the DC-coupled photovoltaic power generation system is controlled to enter the grid-connected battery priority state by: setting the photovoltaic inverter in the DC-coupled photovoltaic power generation system to operate at full power, and setting the bus voltage to be in an MPPT mode; turning on the photovoltaic inverter when the bus voltage is in the MPPT mode; and setting the direct current converter in the DC-coupled photovoltaic power generation system to be in the constant power mode, and controlling the direct current converter to discharge at a second preset conversion power.

In an embodiment, the first preset conversion power is 30 kW, and the second preset conversion power is 500 kW. The second preset conversion power may range from −2160 kW to 3600 kW. The first preset conversion power and the second preset conversion power are not limited herein, and depend on the application environment and user requirements. All the implementations fall within the protection scope of the present disclosure.

In practice, when the DC-coupled photovoltaic power generation system is started, if the photovoltaic energy of the DC-coupled photovoltaic power generation system is sufficient, the photovoltaic inverter in the DC-coupled photovoltaic power generation system is controlled to operate at full power, so that the system transmits power to the power grid through the photovoltaic inverter operating at full power, reducing photovoltaic curtailment. MPPT refers to maximum power point tracking. The photovoltaic inverter operates in the MPPT mode, and an output power of the photovoltaic array is adjusted based on various external characteristics, such as the ambient temperature and light intensity, so that the photovoltaic array always outputs maximum power. Therefore, if it is determined that the photovoltaic energy of the DC-coupled photovoltaic power generation system is sufficient, the maximum power of the photovoltaic side can be outputted by the MPPT mode. In addition, according to the solution of the present disclosure, since the grid-connected battery priority state requires the battery to preferentially discharge electricity, the direct current converter in the DC-coupled photovoltaic power generation system is controlled to operate at constant power, so as to accurately control a power of a battery side.

In this embodiment, when the DC-coupled photovoltaic power generation system is started, it is determined whether to control the DC-coupled photovoltaic power generation system to enter the grid-connected battery priority state based on the photovoltaic energy of the DC-coupled photovoltaic power generation system, so as to accurately control the power of the battery side, and facilitate the subsequent online switchover operation in a case of determining that the photovoltaic energy is insufficient, further improving the reliability of the operating state switching method of the DC-coupled photovoltaic power generation system.

Figure 7:
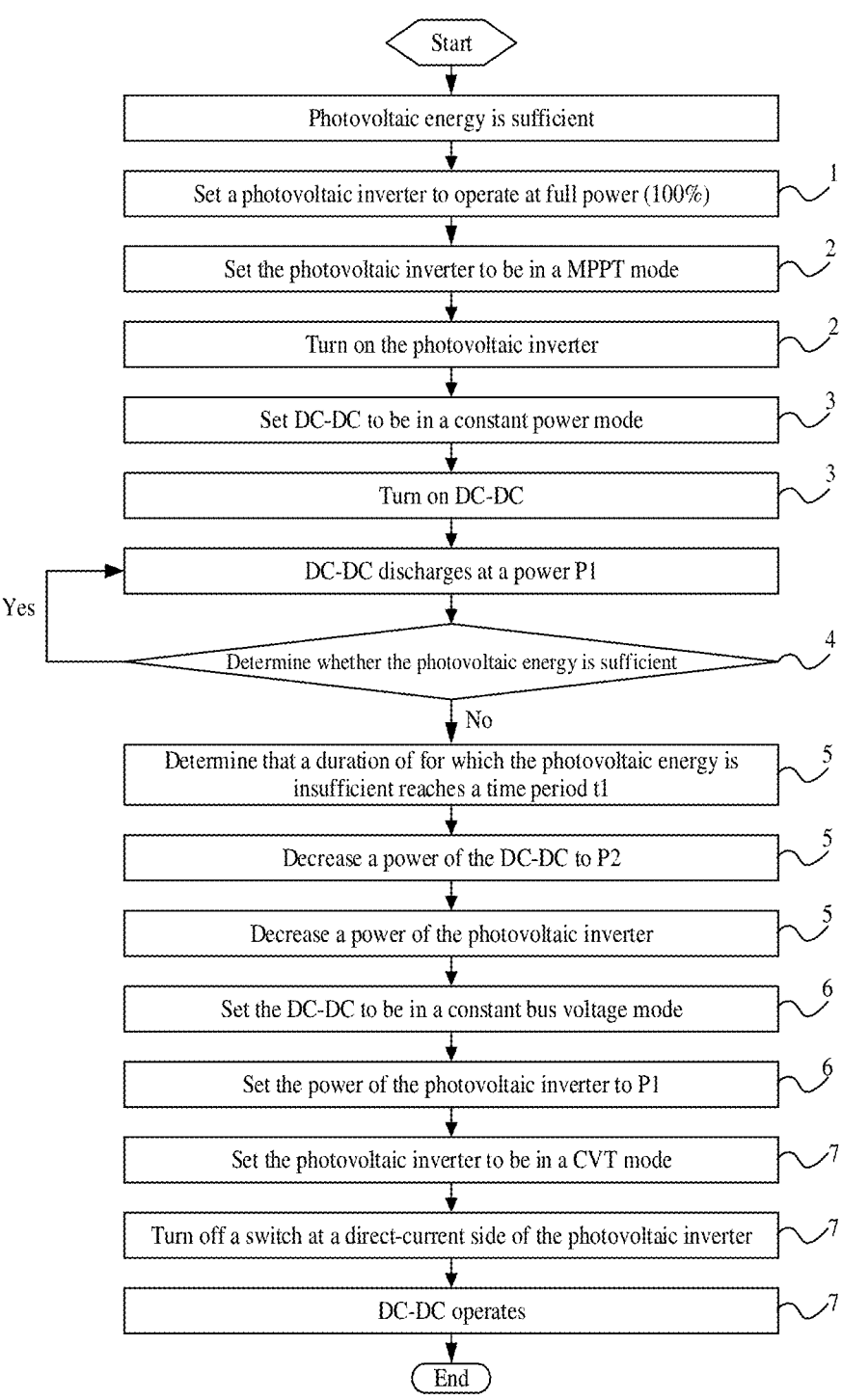
FIG. 7 is a flowchart of an operating state switching method of a DC-coupled photovoltaic power generation system according to another embodiment of the present disclosure.

Based on the operating state switching method of the DC-coupled photovoltaic power generation system according to the above embodiments, referring to FIG. 7, in practice, the method is implemented by the following steps 1 to 7.

In step 1, it is determined that the photovoltaic energy of the DC-coupled photovoltaic power generation system is sufficient, and the photovoltaic inverter is set to operate at full power (100%).

In step 2, the bus voltage of the photovoltaic inverter in the DC-coupled photovoltaic power generation system is set to be in the MPPT mode, and the photovoltaic inverter is turned on.

In step 3, after the photovoltaic inverter is successfully turned on, the direct current converter (DC-DC) in the DC-coupled photovoltaic power generation system is set to be in the constant power mode, and the direct current converter is turned on.

In step 4, the direct current converter discharges at a power P1, and it is detected whether the photovoltaic energy is sufficient in real time. In a case that the photovoltaic energy is sufficient, the direct current converter discharges at the constant power. In this case, the system operates in the grid-connected battery priority state, and the bus voltage is controlled by the photovoltaic inverter.

In step 5, in a case that the photovoltaic energy is insufficient and a duration for which the photovoltaic energy is insufficient reaches a time period t1, the online switchover operation is performed. The operating power of the direct current converter is decreased first. When the operating power of the direct current converter is decreased to a preset power P2, the operating power of the photovoltaic inverter is decreased to a low preset power.

In step 6, when the operating power of the photovoltaic inverter is decreased to the preset power, the direct current converter is set to be in the constant bus voltage mode. When the direct current converter is successfully switched from the constant power mode to the constant bus voltage mode, the operating power of the photovoltaic inverter is restored to the power P1.

In step 7, the bus voltage of the photovoltaic inverter is controlled by the CVT way and the switch at the direct current side of the photovoltaic inverter is turned off. In such case, the direct current converter operates in the constant bus voltage mode, and when the system operates normally, the online switching process ends, the system enters the nighttime battery discharge state, and the direct current bus voltage is controlled by the direct current converter.

It should be noted that, the above embodiment is only a specific application example according to the present disclosure, and actual application examples are not limited to the above and may further be deformed according to the application environment and user requirements. As long as implementations have the same principle and idea as those according to the present disclosure, all the implementations fall within the protection scope of the present disclosure.

Figure 8:
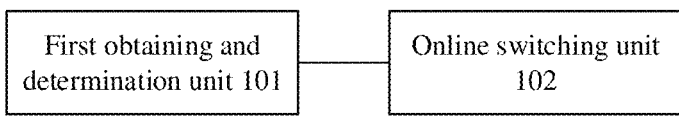
FIG. 8 is a schematic structural diagram of an operating state switching device of a DC-coupled photovoltaic power generation system according to an embodiment of the present disclosure.

Corresponding to the operating state switching method of the DC-coupled photovoltaic power generation system according to the above embodiments, in an embodiment, an operating state switching device of a DC-coupled photovoltaic power generation system is provided according to an embodiment of the present disclosure. Referring to FIG. 8, the device mainly includes a first obtaining and determination unit 101 and an online switching unit 102.

The first obtaining and determination unit 101 is configured to obtain photovoltaic energy of the DC-coupled photovoltaic power generation system and determine whether the photovoltaic energy is sufficient, in a case that the DC-coupled photovoltaic power generation system operates in a grid-connected battery priority state.

The online switching unit 102 is configured to perform an online switchover operation, if it is determined that the photovoltaic energy is insufficient. The online switchover operation is used to switch the operating state of the DC-coupled photovoltaic power generation system from the grid-connected battery priority state to a nighttime battery discharge state.

In some embodiments, the operating state switching device of the DC-coupled photovoltaic power generation system further includes a second obtaining and determination unit and a second control unit.

The second obtaining and determination unit is configured to obtain the photovoltaic energy of the DC-coupled photovoltaic power generation system and determine whether the photovoltaic energy is sufficient, when the DC-coupled photovoltaic power generation system is started.

The second control unit is configured to control the DC-coupled photovoltaic power generation system to enter the grid-connected battery priority state, if it is determined that the photovoltaic energy is sufficient.

In some embodiments, the operating state switching device of the DC-coupled photovoltaic power generation system further includes a determination unit.

The determination unit is configured to determine, before performing the online switchover operation, whether a duration for which the photovoltaic energy of the DC-coupled photovoltaic power generation system is insufficient is greater than a preset duration.

If it is determined that the duration for which the photovoltaic energy of the DC-coupled photovoltaic power generation system is insufficient is greater than the preset duration, the online switchover operation is performed. If it is determined that the duration for which the photovoltaic energy of the DC-coupled photovoltaic power generation system is insufficient is less than or equal to the preset duration, it is determined whether the duration for which the photovoltaic energy of the DC-coupled photovoltaic power generation system is insufficient is greater than the preset duration, until it is determined that the duration for which the photovoltaic energy of the DC-coupled photovoltaic power generation system is insufficient is greater than the preset duration.

In some embodiments, the DC-coupled photovoltaic power generation system is controlled to enter the grid-connected battery priority state by: setting the photovoltaic inverter in the DC-coupled photovoltaic power generation system to operate at full power, and setting the bus voltage to be in an MPPT mode; turning on the photovoltaic inverter when the bus voltage is in the MPPT mode; and setting a direct current converter in the DC-coupled photovoltaic power generation system to be in a constant power mode, and controlling the direct current converter to discharge at a second preset conversion power.

In some embodiments, it is determined whether the photovoltaic energy is sufficient by: determining whether a voltage at a photovoltaic side of the DC-coupled photovoltaic power generation system is greater than a preset voltage; if it is determined that the voltage at the photovoltaic side of the DC-coupled photovoltaic power generation system is greater than the preset voltage, determining that the photovoltaic energy is sufficient; and if it is determined that the voltage at the photovoltaic side of the DC-coupled photovoltaic power generation system is less than or equal to the preset voltage, determining that the photovoltaic energy is insufficient.

In some embodiments, it is determined whether the photovoltaic energy is sufficient by: determining whether an output power of the photovoltaic side of the DC-coupled photovoltaic power generation system is greater than a preset power; if it is determined that the output power of the photovoltaic side of the DC-coupled photovoltaic power generation system is greater than the preset power, determining that the photovoltaic energy is sufficient; and if it is determined that the output power of the photovoltaic side of the DC-coupled photovoltaic power generation system is less than or equal to the preset power, determining that the photovoltaic energy is insufficient.

In some embodiments, the online switchover operation includes as follows. An operating power of the direct current converter in the DC-coupled photovoltaic power generation system is decreased to a first preset conversion power, an operating power of the photovoltaic inverter in the DC-coupled photovoltaic power generation system is decreased to a first preset inversion power. When the operating power of the photovoltaic inverter in the DC-coupled photovoltaic power generation system is decreased to the first preset inversion power, the direct current converter is controlled to operate in a constant bus voltage mode, the photovoltaic inverter is controlled to operate at a second preset inversion power, and a bus voltage of the photovoltaic inverter is controlled by a CVT way. Finally, a switch at a direct current side of the photovoltaic inverter is turned off.

Based on the above embodiments, in the operating state switching device of the DC-coupled photovoltaic power generation system according to the embodiments of the present disclosure, the first obtaining and determination unit 101 is configured to obtain the photovoltaic energy of the DC-coupled photovoltaic power generation system and determine whether the photovoltaic energy is sufficient, in a case that the DC-coupled photovoltaic power generation system operates in the grid-connected battery priority state; and the online switching unit 102 is configured to perform the online switchover operation if it is determined that the photovoltaic energy is insufficient. The online switchover operation is used to switch the operating state of the DC-coupled photovoltaic power generation system from the grid-connected battery priority state to the nighttime battery discharge state. The operating modes of the photovoltaic inverter and the direct current converter can be switched online based on the photovoltaic energy without shutting down the system, improving the response speed of the system, and solving the problem of the slow response speed of the system caused by offline switching the operating state of the DC-coupled photovoltaic power generation system according to the conventional technology.

It should be noted that for details of various units in the operating state switching device of the DC-coupled photovoltaic power generation system, reference is made to the corresponding embodiments of the above method, which is not repeated herein.

Figure 9:
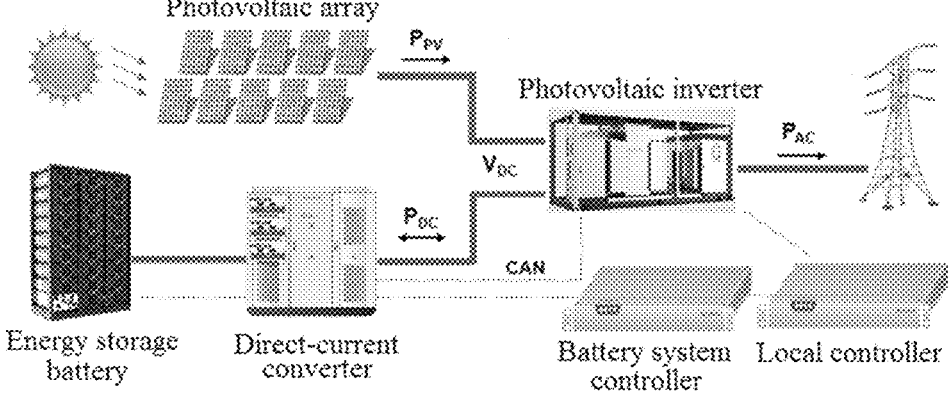
FIG. 9 is a schematic structural diagram of a DC-coupled photovoltaic power generation system according to an embodiment of the present disclosure.

A DC-coupled photovoltaic power generation system is provided according to another embodiment of the present disclosure. Referring to FIG. 9, the DC-coupled photovoltaic power generation system mainly includes an energy storage battery, a direct current converter, a photovoltaic array, a photovoltaic inverter, a battery system controller and a local controller.

A direct current side of the photovoltaic inverter is connected to an output side of the direct current converter and an output side of the photovoltaic array. An output side of the energy storage battery is connected to an input side of the direct current converter. An alternating-current side of the photovoltaic inverter is connected to a power grid.

The photovoltaic inverter is communicatively connected to the direct current converter, the battery system controller is communicatively connected to the direct current converter and the energy storage battery, and the local controller is communicatively connected to the battery system controller and the photovoltaic inverter, to implement the operating state switching method of the DC-coupled photovoltaic power generation system according to any one of the above embodiments of the present disclosure.

It should be noted that for details of the operating state switching method of the DC-coupled photovoltaic power generation system, reference is made to the above corresponding embodiments, and for details of the DC-coupled photovoltaic power generation system, reference is made to the conventional technology, which is not repeated herein.

Various embodiments in this specification are described in a progressive manner, the same and similar parts among the embodiments may be referred to each other, and each of the embodiments focuses on differences from other embodiments. In particular, the system or embodiments of the system are similar to the embodiments of the method, and therefore are described in a simplified manner, and relevant parts may be referred to descriptions of the embodiments of the method. The above-described system and the embodiments of the system are only illustrative. A unit described as a separate component may or may not be physically separated. Components shown as units may or may not be physical units, that is, the components may be located in one place or may be distributed onto multiple network units. Some or all modules thereof may be selected based on an actual requirement, to implement an objective of the solutions in the embodiments. Those skilled in the art may understand and implement the present disclosure without any creative effort.

Those skilled in the art may further understand that, units and algorithm steps described in conjunction with the embodiments disclosed herein may be realized by electronic hardware, computer software or a combination thereof. In order to clearly describe interchangeability of the hardware and the software, the composition and steps of each of the embodiments are generally described above based on functions. Whether these functions are performed in hardware or software depends on the specific application and design constraints for the technical solution. Those skilled in the art may use different methods for each particular application to implement the described functions, but such implementation should not be considered as going beyond the scope of the present disclosure.

The above description of the embodiments disclosed herein enables those skilled in the art to implement or use the present disclosure. Various modifications to these embodiments are apparent to those skilled in the art, and the general principles defined herein may be implemented in other embodiments without departing from the scope of the present disclosure. Therefore, the present disclosure is not limited to the embodiments described herein, but should be in accordance with the broadest scope consistent with the principle and novel features disclosed herein.

The invention claimed is:

1. An operating state switching method of a direct current (DC)-coupled photovoltaic power generation system, comprising:

obtaining photovoltaic energy of the DC-coupled photovoltaic power generation system and determining whether the photovoltaic energy is sufficient, in a case that the DC-coupled photovoltaic power generation system operates in a grid-connected battery priority state; and if it is determined that the photovoltaic energy is insufficient, performing an online switchover operation, wherein the online switchover operation is used to switch the operating state of the DC-coupled photovoltaic power generation system from the grid-connected battery priority state to a nighttime battery discharge state.

2. The operating state switching method of the DC-coupled photovoltaic power generation system according to claim 1, in a case of determining that the photovoltaic energy is sufficient, further comprising:

controlling the DC-coupled photovoltaic power generation system to remain in the grid-connected battery priority state.

3. The operating state switching method of the DC-coupled photovoltaic power generation system according to claim 1, before the performing an online switchover operation, further comprising:

determining whether a duration for which the photovoltaic energy of the DC-coupled photovoltaic power generation system is insufficient is greater than a preset duration, wherein if it is determined that the duration for which the photovoltaic energy of the DC-coupled photovoltaic power generation system is insufficient is greater than the preset duration, the online switchover operation is performed; and if it is determined that the duration for which the photovoltaic energy of the DC-coupled photovoltaic power generation system is insufficient is less than or equal to the preset duration, it is determined whether the duration for which the photovoltaic energy of the DC-coupled photovoltaic power generation system is insufficient is greater than the preset duration, until it is determined that the duration for which the photovoltaic energy of the DC-coupled photovoltaic power generation system is insufficient is greater than the preset duration.

4. The operating state switching method of the DC-coupled photovoltaic power generation system according to claim 1, the determining whether the photovoltaic energy is sufficient comprising:

determining whether a voltage at a photovoltaic side of the DC-coupled photovoltaic power generation system is greater than a preset voltage;

if it is determined that the voltage at the photovoltaic side of the DC-coupled photovoltaic power generation system is greater than the preset voltage, determining that the photovoltaic energy is sufficient; and if it is determined that the voltage at the photovoltaic side of the DC-coupled photovoltaic power generation system is less than or equal to the preset voltage, determining that the photovoltaic energy is insufficient.

5. The operating state switching method of the DC-coupled photovoltaic power generation system according to claim 1, the determining whether the photovoltaic energy is sufficient comprising:

determining whether an output power of a photovoltaic side of the DC-coupled photovoltaic power generation system is greater than a preset power;

if it is determined that the output power of the photovoltaic side of the DC-coupled photovoltaic power generation system is greater than the preset power, determining that the photovoltaic energy is sufficient; and if it is determined that the output power of the photovoltaic side of the DC-coupled photovoltaic power generation system is less than or equal to the preset power, determining that the photovoltaic energy is insufficient.

6. The operating state switching method of the DC-coupled photovoltaic power generation system according to claim 1, the online switchover operation comprising:

decreasing an operating power of a direct current converter in the DC-coupled photovoltaic power generation system to a first preset conversion power, and decreasing an operating power of a photovoltaic inverter in the DC-coupled photovoltaic power generation system to a first preset inversion power;

controlling the direct current converter to operate in a constant bus voltage mode, controlling the photovoltaic inverter to operate at a second preset inversion power, and controlling a bus voltage of the photovoltaic inverter by a constant voltage tracking (CVT) way, when the operating power of the photovoltaic inverter in the DC-coupled photovoltaic power generation system is decreased to the first preset inversion power; and turning off a switch at a direct current side of the photovoltaic inverter.

7. The operating state switching method of the DC-coupled photovoltaic power generation system according to claim 1, further comprising:

obtaining, when the DC-coupled photovoltaic power generation system is started, the photovoltaic energy of the DC-coupled photovoltaic power generation system and determining whether the photovoltaic energy is sufficient; and if it is determined that the photovoltaic energy is sufficient, controlling the DC-coupled photovoltaic power generation system to enter the grid-connected battery priority state.

8. The operating state switching method of the DC-coupled photovoltaic power generation system according to claim 7, the controlling the DC-coupled photovoltaic power generation system to enter the grid-connected battery priority state comprising:

setting a photovoltaic inverter in the DC-coupled photovoltaic power generation system to operate at full power, and setting a bus voltage to be in a maximum power point tracking (MPPT) mode;

turning on the photovoltaic inverter when the bus voltage is in the MPPT mode; and setting a direct current converter in the DC-coupled photovoltaic power generation system to be in a constant power mode, and controlling the direct current converter to discharge at a second preset conversion power.

9. A direct current (DC)-coupled photovoltaic power generation system, comprising: an energy storage battery, a direct current converter, a photovoltaic array, a photovoltaic inverter, a battery system controller and a local controller, wherein a direct current side of the photovoltaic inverter is connected to an output side of the direct current converter and an output side of the photovoltaic array, an output side of the energy storage battery is connected to an input side of the direct current converter, and an alternating-current side of the photovoltaic inverter is connected to a power grid; and the photovoltaic inverter is communicatively connected to the direct current converter, the battery system controller is communicatively connected to the direct current converter and the energy storage battery, and the local controller is communicatively connected to the battery system controller and the photovoltaic inverter, to implement the operating state switching method of the DC-coupled photovoltaic power generation system according to claim 1.

10. An operating state switching device of a direct current (DC)-coupled photovoltaic power generation system, comprising:

a first obtaining and determination unit, configured to obtain photovoltaic energy of the DC-coupled photovoltaic power generation system and determine whether the photovoltaic energy is sufficient, in a case that the DC-coupled photovoltaic power generation system operates in a grid-connected battery priority state; and an online switching unit, configured to perform an online switchover operation if it is determined that the photovoltaic energy is insufficient, wherein the online switchover operation is used to switch the operating state of the DC-coupled photovoltaic power generation system from the grid-connected battery priority state to a nighttime battery discharge state.

11. The operating state switching device of the DC-coupled photovoltaic power generation system according to claim 10, further comprising:

a first control unit, configured to control the DC-coupled photovoltaic power generation system to remain in the grid-connected battery priority state, if it is determined that the photovoltaic energy is sufficient.

12. The operating state switching device of the DC-coupled photovoltaic power generation system according to claim 10, further comprising:

a determination unit, configured to determine, before performing the online switchover operation, whether a duration for which the photovoltaic energy of the DC-coupled photovoltaic power generation system is insufficient is greater than a preset duration, wherein if it is determined that the duration for which the photovoltaic energy of the DC-coupled photovoltaic power generation system is insufficient is greater than the preset duration, the online switchover operation is performed; and if it is determined that the duration for which the photovoltaic energy of the DC-coupled photovoltaic power generation system is insufficient is less than or equal to the preset duration, it is determined whether the duration for which the photovoltaic energy of the DC-coupled photovoltaic power generation system is insufficient is greater than the preset duration, until it is determined that the duration for which the photovoltaic energy of the DC-coupled photovoltaic power generation system is insufficient is greater than the preset duration.

13. The operating state switching device of the DC-coupled photovoltaic power generation system according to claim 10, further comprising:

a second obtaining and determination unit, configured to obtain the photovoltaic energy of the DC-coupled photovoltaic power generation system and determine whether the photovoltaic energy is sufficient, when the DC-coupled photovoltaic power generation system is started; and a second control unit, configured to control the DC-coupled photovoltaic power generation system to enter the grid-connected battery priority state, if it is determined that the photovoltaic energy is sufficient.

\* \* \* \* \*